(12) United States Patent
McKelvie et al.

(10) Patent No.: US 11,269,846 B2
(45) Date of Patent: Mar. 8, 2022

(54) EFFICIENT DATABASE JOURNALING USING NON-VOLATILE SYSTEM MEMORY

(71) Applicant: Amazon Technologies, Inc., Seattle, WA (US)

(72) Inventors: Samuel James McKelvie, Seattle, WA (US); Anurag Windlass Gupta, Atherton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 250 days.

(21) Appl. No.: 16/543,132

(22) Filed: Aug. 16, 2019

(65) Prior Publication Data

US 2019/0370244 A1 Dec. 5, 2019

Related U.S. Application Data

(63) Continuation of application No. 14/070,347, filed on Nov. 1, 2013, now Pat. No. 10,387,399.

(51) Int. Cl.
    *G06F 16/23* (2019.01)
(52) U.S. Cl.
    CPC .................................. *G06F 16/23* (2019.01)
(58) Field of Classification Search
    None
    See application file for complete search history.

(56) References Cited

U.S. PATENT DOCUMENTS

| | | | |
|---|---|---|---|
| 5,280,612 A | 1/1994 | Lorie et al. | |
| 5,471,614 A | 11/1995 | Kakimoto | |
| 5,524,205 A | 6/1996 | Lomet et al. | |
| 5,530,850 A | 6/1996 | Ford et al. | |
| 5,696,967 A * | 12/1997 | Hayashi | G06F 11/1471 714/20 |
| 5,832,516 A * | 11/1998 | Bamford | G06F 16/00 |
| 5,870,758 A | 2/1999 | Bamford et al. | |
| 5,907,848 A | 5/1999 | Zaiken et al. | |
| 6,233,585 B1 | 5/2001 | Gupta et al. | |

(Continued)

FOREIGN PATENT DOCUMENTS

| | | |
|---|---|---|
| EP | 0675451 | 4/1995 |
| EP | 1277115 | 1/2003 |

OTHER PUBLICATIONS

U.S. Appl. No. 14/070,362, filed Nov. 1, Samuel James Mckelvie.

(Continued)

*Primary Examiner* — Kim T Nguyen
(74) *Attorney, Agent, or Firm* — Robert C. Kowert; Kowert, Hood, Munyon, Rankin & Goetzel, P.C.

(57) ABSTRACT

A database system may implement efficient database journaling using non-volatile system memory. An update to a database may be received, and log records indicating the update may be generated. A non-volatile portion of the system memory may be directly accessed to store the generated log records such that in the event of a failure of the database, the log records may be still maintained. Log records stored to the non-volatile portion of the system memory may be identified as durably persisted, in some embodiments. Log records may be identified and sent to block-based storage, in some embodiments. Recovery from a database system failure, in some embodiments, by obtaining log records from the non-volatile portion of system memory.

20 Claims, 9 Drawing Sheets

(56) References Cited

U.S. PATENT DOCUMENTS

| | | | |
|---|---|---|---|
| 6,240,413 B1 | 5/2001 | Learmont | |
| 6,615,219 B1 | 9/2003 | Bruso et al. | |
| 6,631,374 B1 | 10/2003 | Klein et al. | |
| 6,631,478 B1 * | 10/2003 | Wang | G06F 11/1471 |
| | | | 714/15 |
| 6,732,171 B2 | 5/2004 | Hayden | |
| 6,832,229 B2 | 12/2004 | Reed | |
| 6,896,609 B2 | 5/2005 | Lindsey et al. | |
| 6,898,609 B2 * | 5/2005 | Kerwin | G06F 16/252 |
| | | | 707/634 |
| 6,976,022 B2 | 12/2005 | Vemuri et al. | |
| 7,010,645 B2 | 3/2006 | Hetzler et al. | |
| 7,089,253 B2 | 8/2006 | Hinshaw et al. | |
| 7,146,386 B2 | 12/2006 | Xiao | |
| 7,305,386 B2 | 12/2007 | Hinshaw et al. | |
| 7,308,456 B2 | 12/2007 | Friske et al. | |
| 7,415,489 B2 | 8/2008 | Palapudi et al. | |
| 7,472,138 B2 | 12/2008 | Adkins et al. | |
| 7,716,645 B2 | 5/2010 | Dolby et al. | |
| 7,747,565 B2 * | 6/2010 | Harris | G06F 8/443 |
| | | | 707/609 |
| 7,747,663 B2 | 6/2010 | Atkin et al. | |
| 7,783,682 B1 * | 8/2010 | Patterson | G06F 12/0253 |
| | | | 707/813 |
| 7,809,778 B2 | 10/2010 | Mitaru | |
| 7,885,922 B2 | 2/2011 | Pareek et al. | |
| 7,930,271 B2 | 4/2011 | Tarbell | |
| 7,937,551 B2 | 5/2011 | Schott | |
| 7,979,670 B2 | 7/2011 | Saliba et al. | |
| 8,131,723 B2 | 3/2012 | Sim-Tang | |
| 8,209,515 B2 | 6/2012 | Schott | |
| 8,255,627 B2 | 8/2012 | Blinick et al. | |
| 8,266,114 B2 | 9/2012 | Mace et al. | |
| 8,271,830 B2 | 9/2012 | Erofeev | |
| 8,289,801 B2 | 10/2012 | Smith et al. | |
| 8,301,670 B2 | 10/2012 | Revah et al. | |
| 8,326,897 B2 | 12/2012 | Butterworth et al. | |
| 8,341,128 B1 | 12/2012 | Ruggiero | |
| 8,370,715 B2 | 2/2013 | Hafner et al. | |
| 8,380,670 B2 | 2/2013 | Kuber et al. | |
| 8,386,421 B2 * | 2/2013 | Reid | G06F 16/2329 |
| | | | 707/609 |
| 8,392,479 B1 | 3/2013 | Pantin | |
| 8,396,831 B2 | 3/2013 | Larson et al. | |
| 8,397,032 B2 | 3/2013 | Elnozahy | |
| 8,412,689 B2 | 4/2013 | Reid et al. | |
| 8,412,752 B2 | 4/2013 | Dodge | |
| 8,429,121 B2 | 4/2013 | Pareek et al. | |
| 8,463,754 B2 * | 6/2013 | Murakami | G11B 27/034 |
| | | | 707/682 |
| 10,387,399 B1 | 8/2019 | McKelvie et al. | |
| 2002/0107835 A1 | 8/2002 | Coram et al. | |
| 2002/0143733 A1 | 10/2002 | Mukkamalla et al. | |
| 2003/0046121 A1 | 3/2003 | Menninger et al. | |
| 2004/0133622 A1 | 7/2004 | Clubb et al. | |
| 2004/0249869 A1 | 12/2004 | Oksanen | |
| 2005/0262161 A1 | 11/2005 | Holmes et al. | |
| 2008/0168081 A1 | 7/2008 | Gaurav et al. | |
| 2008/0183973 A1 | 7/2008 | Aguilera et al. | |
| 2008/0208924 A1 | 8/2008 | Bradshaw et al. | |
| 2009/0024551 A1 | 1/2009 | Agrawal et al. | |
| 2009/0193393 A1 | 7/2009 | Baldwin et al. | |
| 2010/0050172 A1 | 2/2010 | Ferris | |
| 2010/0192131 A1 | 7/2010 | Dolby et al. | |
| 2011/0035548 A1 | 2/2011 | Kimmel et al. | |
| 2011/0161496 A1 | 6/2011 | Nicklin | |
| 2012/0041899 A1 | 2/2012 | Greene et al. | |
| 2012/0054447 A1 | 3/2012 | Swart et al. | |
| 2012/0143825 A1 | 6/2012 | Boehm et al. | |
| 2012/0174112 A1 | 7/2012 | Vaidya et al. | |
| 2012/0191648 A1 | 7/2012 | Kuber et al. | |
| 2012/0297073 A1 | 11/2012 | Glover et al. | |
| 2012/0310985 A1 | 12/2012 | Gale et al. | |
| 2012/0310986 A1 | 12/2012 | Frantz et al. | |
| 2012/0310991 A1 | 12/2012 | Frantz et al. | |
| 2012/0317382 A1 | 12/2012 | Steed | |
| 2013/0036281 A1 | 2/2013 | Revah et al. | |
| 2013/0042156 A1 | 2/2013 | Srinivasan et al. | |
| 2013/0080386 A1 | 3/2013 | Dwyer et al. | |
| 2013/0080388 A1 | 3/2013 | Dwyer et al. | |
| 2013/0086129 A1 | 4/2013 | Brown et al. | |

OTHER PUBLICATIONS

U.S. Appl. No. 14/070,359, filed Nov. 1, Samuel James Mckelvie.

U.S. Appl. No. 14/070,355, filed Nov. 1, Samuel James Mckelvie.

U.S. Appl. No. 14/070,350, filed Nov. 1, Samuel James Mckelvie.

Adrian Proctor "Non-Volatile Memory: Non Volatile Memory and its use in Enterprise Applications" 2012 whitepaper downloaded from http://www.vikingtechnology.com/sites/default/files/featuredvideos/NVDIMM_Technology.pdf, pp. 1-8.

U.S. Appl. No. 13/872,530, filed Apr. 29, 2013; Samuel James Mckelvie.

Yuan Xie "Emerging NVM Memory Technologies", Penn State Department of Computer Science and Engineering, Downloaded from http://web.engr.oregonstate.edu/~sllu/xie.pdf on Aug. 13, 2013, pp. 1-31.

"NV-DIMM: Fastest Tier in Your Storage Strategy", 2012 Whitepaper, Viking Technology, pp. 1-7.

U.S. Appl. No. 13/967,185, filed Aug. 14, 2013, Anurag Windlass Gupta.

IBM, "Storage Class Memory : Towards a Disruptively Low-Cost Solid-State Non-Volatile Memory", Almaden Research Center; Jan. 2013, pp. 1-27.

GitHub-Gist, "Latency Numbers Every Programmer Should Know", 6 pages.

Technology Lab/ Information Technology, Sean Gallagher, "Memory That Never Forgets: Non-Volatile DIMMS Hit the Market", Apr. 4, 2013; 3 pages.

U.S. Appl. No. 13/169,391, filed Jun. 27, 2011, Carlos A. Arguelles.

Amazon Web Services Blog Downloaded Apr. 30, 2013 from http://aws.typepad.com/aws/201 0/1 0/amazon-rdsannouncing-read-replicas.html. Published Oct. 5, 201 0 pp. 1-11.

Bloom Filter Downloaded from http://en.wikipedia.org/wiki/Bioom_filteron May 15, 2013, pp. 1-12.

John Clarke "SQL Result Set Cache in Oracle 11 gR2" published Nov. 16, 2011 downloaded May 15, 2013 from http://www.centroid.com/knowledgebase/blog/sql-result-set-cache-in-oracle-11 gr2, pp. 1-27.

Jim Czuprynski "Oracle Database 11 g: SQL Query Result Set Caching" published Jul. 30, 2008, downloaded May 15, 2013 from http://www.databasejournal.com/features/oracle/article.php/3760761 /Oracle-Database-11 g-SQL -Query-DResult-Set-Caching.htm, pp. 1-7.

Oracle Database JDBC Developer's Guide and Reference: Chapter 20 Statement and Result Set 5 Cachingdownloaded from http://docs.oracle.com/cd/B28359 01 /java .1111 b31224/stmtcach.htm via the Wayback Machine Nov. 27, 2011, pp. 1-8.

Adrian Billington "Query Result Cache in Oracle 11 g" downloaded from http:/lweb.archive.org/web/20080124161135/http://www.oracle-developer.net/display php?id=503 via the Wayback Machine Jan. 4, 2008, pp. 1-20.

Julian Dontcheff "Bloom Filters for DBAs" published Aug. 28, 2012, downloaded from http://juliandontcheff. wordpress. com/20 12/08/28/bloom-filters-for- db as/ on May 14, 2013, pp. 1-4.

Julian Dyke "Result Cache Internals" Nov. 2007, pp. 1-38.

Michele Cyran et al. "Oracle Database Concepts 1 Og Release 2 (1 0.2)" Oct. 2005, pp. 1-542.

Lance Ashdown et al. "Oracle Database Concepts 11 g Release 2 (11 .2)" Sep. 2011, pp. 1-460.

Isolation (database systems) downloaded from http://en.wikipedia.org/wiki/Isolation_(database_systems) on May 15, 2013, pp. 1-7.

* cited by examiner

EFFICIENT DATABASE JOURNALING USING NON-VOLATILE SYSTEM MEMORY

This application is a continuation of U.S. patent application Ser. No. 14/070,347, filed Nov. 1, 2013, which is hereby incorporated by reference herein in its entirety.

BACKGROUND

As increasing amounts of data are stored and maintained for a variety of different purposes, optimizing the performance of access requests and other operations performed by database systems with regard to stored data is becoming increasingly important when handling larger amounts of data and greater numbers of access requests. Typically, database systems have implemented various journaling techniques, such as write-ahead logging, to record updates or changes to data or metadata associated with the database. However, log records that record these changes to data or metadata may themselves need to be persisted so that the state of the database may be recoverable upon a failure of the database system. Typical techniques implemented to ensure that log records are persisted, such as by flushing log records to a persistent storage device, are very often subject to the limitations of such devices for performing different access requests, dulling the effectiveness of database journaling techniques for persisting changes to the database.

Figure 1:
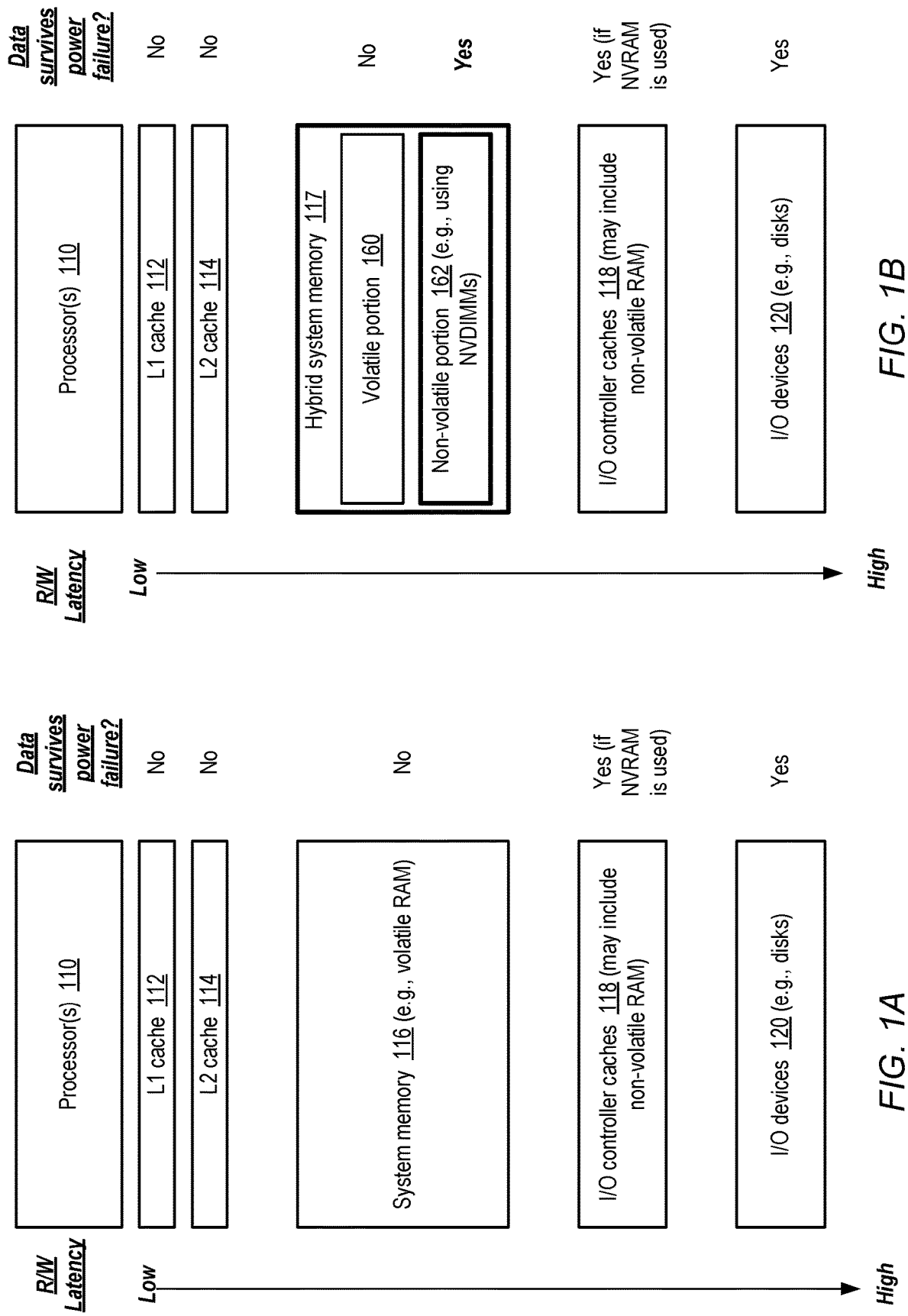
FIGS. 1A and 1B illustrate respective examples of the use of non-volatile memory in alternative memory hierarchies that may be employed in computer systems, according to at least some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of database journaling using non-volatile system memory are described herein. Database systems may implement various journaling techniques to provide database systems with the ability to recover a consistent state of the database in the event of a database failure. Log records indicating updates to the database may be generated. These log records may be different types, such as redo log records, undo log records, transaction log records. A non-volatile portion of system memory, such as implemented as part of a hybrid memory module implementing non-volatile system memory and volatile system memory, may be directly accessed to store the log records in a portion of the log maintained in the non-volatile system memory. In the event of a failure of the database, the log records may be maintained in the non-volatile system memory upon recovery from the failure. In response to response to storing each of the log records, the log record may be identified as durably persisted to the log for the database.

In many conventional computer systems, all of the system memory may be volatile, in that the data stored in the system memory is typically lost in the event of power loss or a system crash. In such conventional computer systems, data that is intended to survive a power loss or system crash may have to be written to off-board persistent storage devices (such as various block-based storage devices, solid state drives, disks, or various types of disk-based devices such as disk arrays, storage appliances and the like), to which the read and write latencies may be substantially higher than the read and write latencies to system memory. According to at least some embodiments, a hybrid system memory comprising a volatile portion and a non-volatile portion may be implemented for a computer system with one or more processors. Any of a number of technologies, such as various types of non-volatile dual inline memory modules (NV-DIMMs) may be used to implement the non-volatile portion of system memory in different embodiments. Conventional DIMMs may be used for the volatile portion in such embodiments. Volatile and non-volatile system memory may, in various embodiments, be byte addressable. In at least some implementations, the non-volatile portions of system memory may provide similar read and write latencies as the volatile portions—e.g., the latency differences between the volatile and non-volatile portions of system memory may be dwarfed by the latency differences between the non-volatile memory and off-board memory such as disks.

Typical database systems implement journaling techniques designed to utilize off-board storage devices. For instance, in order for a log record for a database to be considered durably persisted for a typical database system, the log record may have to be persisted to the off-board storage device. Such a technique often involves invoking a write interface via an operating system kernel, which may then send the data over the I/O bus to a controller on the off-board storage device which may then write the log record to storage. The path to acknowledge the write at the off-board storage device may be just as lengthy by confirming the write back through the same path to the database system.

In various embodiments, a system comprising one or more processors linked to a system memory that includes a non-volatile portion and a volatile portion may be employed for efficient database journaling. The non-volatile part of system memory may be referred to herein as the NVSM, and the volatile part may be referred to as the VSM. Program instructions stored in the system memory itself may be executed at the one or more processors to manage the allocation and use of both types of the system memory in accordance with various policies in different embodiments.

In at least some implementations, for example due to higher costs of the memory modules used for non-volatile system memory, the amount of NVSM configured at a computer system may be smaller than the amount of VSM configured, or at least smaller than the amount of VSM typically configured in systems with comparable computing capabilities. In such implementations, the NVSM may represent a somewhat scarce resource, and various approaches may be used in an attempt to limit the amount of NVSM space used. In other implementations, enough NVSM may be available that it may not be necessary to consider the NVSM a scarce resource—for example, in some implementations, all of the system memory may comprise non-volatile memory modules.

In at least some embodiments, the NVSM may be protected from being overwritten during a reboot/restart of the computer using various isolation techniques. E.g., in one embodiment, as soon as a power failure or similar event is detected, the NVSM (or a subset of the NVSM) may be latched or locked to prevent further writes, and the latch or lock may be maintained until at least some predetermined phase of recovery is completed after restart. During the interval that it is inaccessible for writes, in some implementations, the NVSM may still be available for reads. After the predetermined phase of recovery is completed, the NVSM may once again be made accessible for writes.

In at least one embodiment, portions of the NVSM may be mapped directly into application address space, e.g., using system calls or interfaces similar in functionality to the mmap( ) and related interfaces, or the shmget( ) and related interfaces available in various Unix™-based operating systems. Such memory mapping interfaces may allow the caller to specify, for example, whether non-volatile memory is to be used for the mapping, or volatile memory is to be used. In some embodiments, the memory management components of the operating system may allow to objects or memory segments to be moved from the volatile portion of system memory to the non-volatile portion, or vice-versa, e.g., using "make_nonvolatile( )" or "make_volatile( )". Invoking make_volatile( ) on a specified memory object O1 may, for example, lead to a memory manager component implementing the following sequence of operations in one implementation: (a) determine whether O1 is in the NVSM already, and if so, return a pointer to O1 and/or a success return code (b) if O1 is not in the NVSM, copy O1's contents to NVSM and return a handle or pointer to the new location within the NVSM and/or a success return code.

FIGS. 1A and 1B illustrate respective examples of the use of non-volatile memory in alternative memory hierarchies that may be employed in computer systems, according to at least some embodiments. FIG. 1A illustrates a conventional memory hierarchy, in which the system or main memory 116 consists entirely of volatile memory modules. In FIG. 1B, in contrast, the system memory includes a non-volatile portion as well as a volatile portion, and is therefore referred to as a hybrid system memory 117. It is noted that a simplified overview of the memory hierarchies is provided in FIGS. 1A and 1B for ease of explanation, and that in different implementations the memory hierarchies may include additional layers, or may exclude some of the layers shown in FIGS. 1A and 1B. It is also noted that while some values of possible read and write latencies are provided below, such values are provided merely as examples, and the actual latencies achieved in different embodiments may differ substantially from the example values.

The read/write latencies (from the perspective of the processors 110) of the various elements of the memory hierarchies increases from the top to the bottom in the figures, as indicated by the respective arrows labeled "R/W Latency" in FIGS. 1A and 1B. Whether data stored in a particular element of the hierarchy survive power failure events (i.e., whether contents of a memory location written before a power failure can be read upon restart after the failure) is indicated for the various hierarchy levels in the respective columns labeled "Data survives power failure?". It is noted that while power failure is used as the example of a failure event that may result in data loss in FIGS. 1A and 1B, other types of failure events, such as operating system crashes or application exits due to various software defects, may also lead to loss of data in various implementations.

In both memory hierarchies illustrated, L1 (level 1) and L2 (level 2) caches, labeled 112 and 114 respectively, represent the fastest (lowest latency) memory elements. Depending on the semiconductor technology being used, in some embodiments, for example, the latencies to the L1 and L2 caches from the processors 110A or 110B may be on the order of between a fraction of a nanosecond (e.g., for L1 cache references) and a few nanoseconds (for L2 cache references). However, none of the data stored in the L1 and L2 caches may survive a power failure.

System memory represents the next fastest layer of the illustrated hierarchies. In some embodiments, for example, the latencies to system memory may be on the order of a hundred nanoseconds, depending on the underlying semiconductor technologies being used and the amount of data involved. In at least some embodiments, the read latencies for the non-volatile portion 162 of a hybrid system memory 117 may be equal to, or very close to, the read latencies for the volatile portion 160 of the hybrid system memory, or to the read latencies for the conventional system memory 116. In some implementations, the write latencies to system memory may be approximately equal to the read latencies. In other embodiments, the write latencies may differ from the read latencies for either the volatile portion 160, the non-volatile portion 162, or both the volatile and non-volatile portions.

According to at least some embodiments, non-volatile memory components may be used to implement various types of caches 118 at I/O controllers, such as disk controllers, RAID (redundant arrays of inexpensive disk) controllers, storage appliance controllers and the like. In order to access such controller caches, in at least some implementations data may be transferred from the system memory, which may be plugged into the same "motherboard" as the processors 110, outside the motherboard to a different printed circuit board over one or more I/O busses. Accordingly, the latency to such I/O controller caches may typically be substantially higher than the latency to system memory, e.g., on the order of a millisecond in some implementations. In the memory hierarchy shown in FIG. 1A, the I/O controller cache 118 represents the nearest (lowest-latency) location at which data can be stored to survive power failure events. In contrast, in the memory hierarchy shown in FIG. 1B, the non-volatile portion 162 of the system memory, which may have a much lower latency than the I/O controller cache, represents the lowest-latency location at which data can be saved to survive power failure events. It is noted that for at least some I/O devices in some embodiments, the corresponding I/O controllers need not implement caches that use non-volatile memory (or may not implement caches at all).

In both the memory hierarchies illustrated in FIG. 1A and FIG. 1B, I/O devices 120 such as disk-based devices are shown as the highest-latency storage locations. In some embodiments, depending for example on the size and rotational speeds of the disks being used, access latencies to the I/O devices (which may include disk head seek time, for example) may be on the order of tens of milliseconds. In some embodiments, for example in large provider networks in which commodity hardware is typically used for hosting many different kinds of applications inexpensively, I/O controller caches may be very small (or may not even be implemented as mentioned above). As a result, in such environments, the I/O devices 120 may represent the lowest-latency persistent storage available unless non-volatile system memory is implemented. The costs of writing and reading critical data to and from disk-based I/O devices (or to I/O controller caches) may significantly increase the time required for recovery operations which may, for example, require reading saved metadata for various applications and system components, and may also expand the time windows of vulnerability for various types of errors or race conditions. In some embodiments, solid-state drives or SSDs may be used, which may provide faster latencies than traditional electromechanical disks, but may typically still have higher latencies than system memory.

Any combinations of various types of devices may be used to implement the volatile and/or non-volatile portions of system memory 117 in different embodiments. For example, dynamic random access memory (DRAM), static random access memory (SRAM), in addition to other random access memory technologies, including, but not limited to dual in-line memory module (DIMM), synchronous dynamic random access memory (SDRAM), double data rate synchronous random access memory (DDR-SDRAM), etc. may be used at least for the volatile portion. For the non-volatile portion of system memory, in some embodiments flash-based memory devices, including for example NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory 162. In some embodiments, hybrid memory modules that each incorporate both volatile and non-volatile memory may be used. As a variety of volatile memory technologies and non-volatile memory technologies are well-known to those of ordinary skill in the art, the above examples are not intended to be limiting.

According to at least some embodiments, a controller associated with system memory may be responsible for enabling write access to at least a portion of the non-volatile system memory (NVSM). In one implementation, such a controller may comprise one or more ASICs (application-specific integrated circuits). In one such embodiment, the controller may be programmed to prevent write access to the NVSM (or selected sub-portions thereof) until a predetermined phase of recovery (e.g., of the operating system as a whole, or of specific operating system components or applications) is completed after a restart of the system. Using such a controller, in at least some embodiments, boot-related processes of the operating system may be prevented from overwriting state information that may have been stored in the NVSM prior to a crash or power failure to assist in subsequent recovery.

Figure 2:
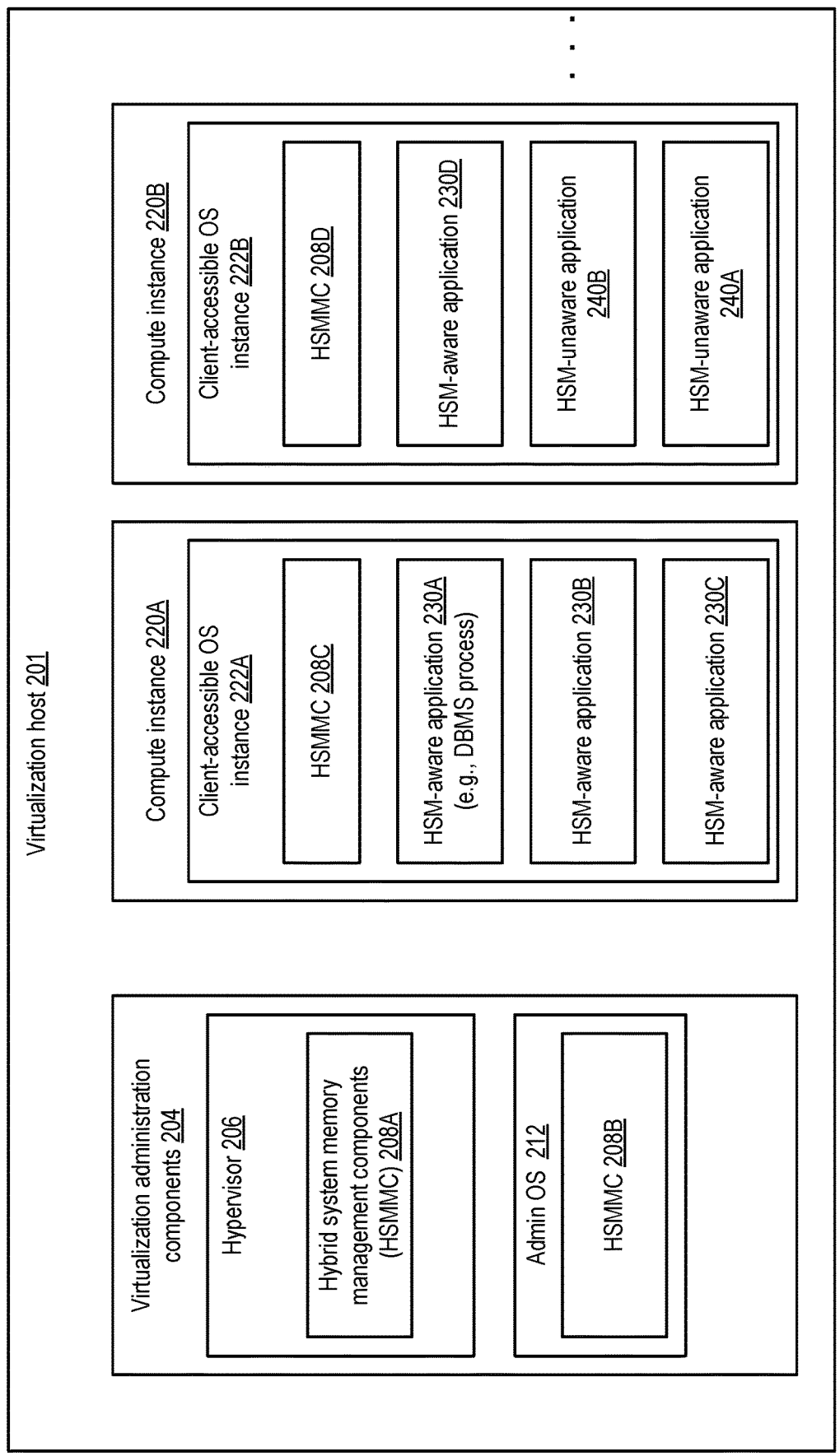
FIG. 2 illustrates example components of a virtualization host that may be configured to manage and utilize hybrid system memory, according to at least some embodiments.

In various embodiments, NVSM may be utilized at different types of computer hosts, including hosts that run operating systems natively, and hosts that run virtualization software to support multiple "compute instances" (virtual machines). A computer system (such as a rack-based server) configured to implement a plurality of compute instances may be referred to as a virtualization host. Many large providers of network-accessible or "cloud-based" services often configure thousands of such virtualization hosts at various data centers around the world. Using compute instances, a number of different higher-level services may also be provided in some cases, such as various types of database services, parallel computation services, load balancing services, workflow management services, and the like. At least some of the types of applications and services typically run using compute instances may be able to benefit from NVSM functionality. FIG. 2 illustrates example components of a virtualization host that may be configured to manage and utilize hybrid system memory, according to at least some embodiments.

As shown, virtualization host 201 may include a set of virtualization administration components 204, and one or more compute instances 220, such as compute instance 220A and 220B in the depicted embodiment. Virtualization administration components 204 may include, for example, a hypervisor 206 and/or an administrative operating system 212 (i.e., an instance of an operating system that is typically not accessible to clients on whose behalf the compute instances are set up, but may be used for various administrative tasks). Each compute instance 220 may comprise its own instance of an operating system, such as client-accessible OS instances 222A and 222B at compute instances 220A and 220B respectively. A number of client applications or application components may be run at each instance.

Virtualization host 201 may include a hybrid system memory (HSM) 117 (not explicitly shown in FIG. 2) comprising both a non-volatile portion and a volatile portion in the depicted embodiment. A number of memory management administrative components at such a host may collectively manage the hybrid system memory in some embodiments. As shown, such hybrid system memory management components (HSMMCs) 208 may exist within the hypervisor 206 (HSMMC 208A), the administrative operating system (HSMMC 208B), and/or also within the client-accessible OS instances 222A (HSMMC 208C) and 222B (HSMMC 208D) in at least some embodiments. Each of the HSMMCs 208 in the embodiment of FIG. 2 may be capable of, for example, determining which portions of the system memory accessible to them are non-volatile and which are volatile, and of performing various memory-related operations on other types of memory, such as allocating, writing, reading, copying or moving objects within the non-volatile or volatile portions, and/or mapping portions of the NVSM or VSM into application address space. Different HSMMCs may have different responsibilities with respect to managing the NVSM in at least some embodiments—e.g., the hypervisor's HSMMC 208A may be responsible for determining how much of the NVSM is to made accessible from each of the compute instances 220, while the instance HSMMCs such as 208C and 208D may be responsible for allocating and managing space within the respective portions of the NVSM available to their instances.

The applications running at the various instances may include some that are "aware" of the hybrid system memory (e.g., HSM-aware applications 230A, 230B, 230C and 230D), and some that are "unaware" of the hybrid system memory (e.g., HSM-unaware applications 240A and 240B). HSM-aware applications 230 may include, for example, source code that explicitly indicates the kind of system memory (volatile versus non-volatile) preferred or desired for various memory objects, while HSM-unaware applications 240 may not provide indications of system memory preferences. A database process implemented as part of a network-accessible database service may, for example, be HSM-aware (e.g., HSM-aware application 230A may comprise a database process) in one embodiment, and may issue memory allocation requests for non-volatile memory for certain key database metadata objects. This may allow HSM-aware applications 230 to directly access non-volatile system memory, without requesting access via operating system components. Various types of programmatic interfaces (such as memory-related system call interfaces) may be available for use by HSM-aware applications in at least some embodiments, as discussed below in reference to FIG. 3 and FIG. 4.

It is noted that in various embodiments, both HSM-unaware applications and HSM-aware applications may be able to benefit from the presence of non-volatile system memory at the host. HSM-aware applications may, as indicated above, provide indications of the kind of system memory preferred for various data structures used, and such indications may be taken into account by the relevant HSMMCs. In at least some embodiments, various other components of the operating systems (such as client-accessible operating system instances 222A and 222B, as well as administrative operating system 212) may also utilize non-volatile system memory for metadata and/or data for various entities such as files, file systems and the like, which may improve the performance and/or reliability of HSM-unaware applications. It is noted that HSMMCs similar to those illustrated in FIG. 2 may be implemented at hosts that do not support virtualization in at least some embodiments, and that both HSM-aware and HSM-unaware applications may benefit from the availability of non-volatile system memory on such hosts as well.

Figure 3:
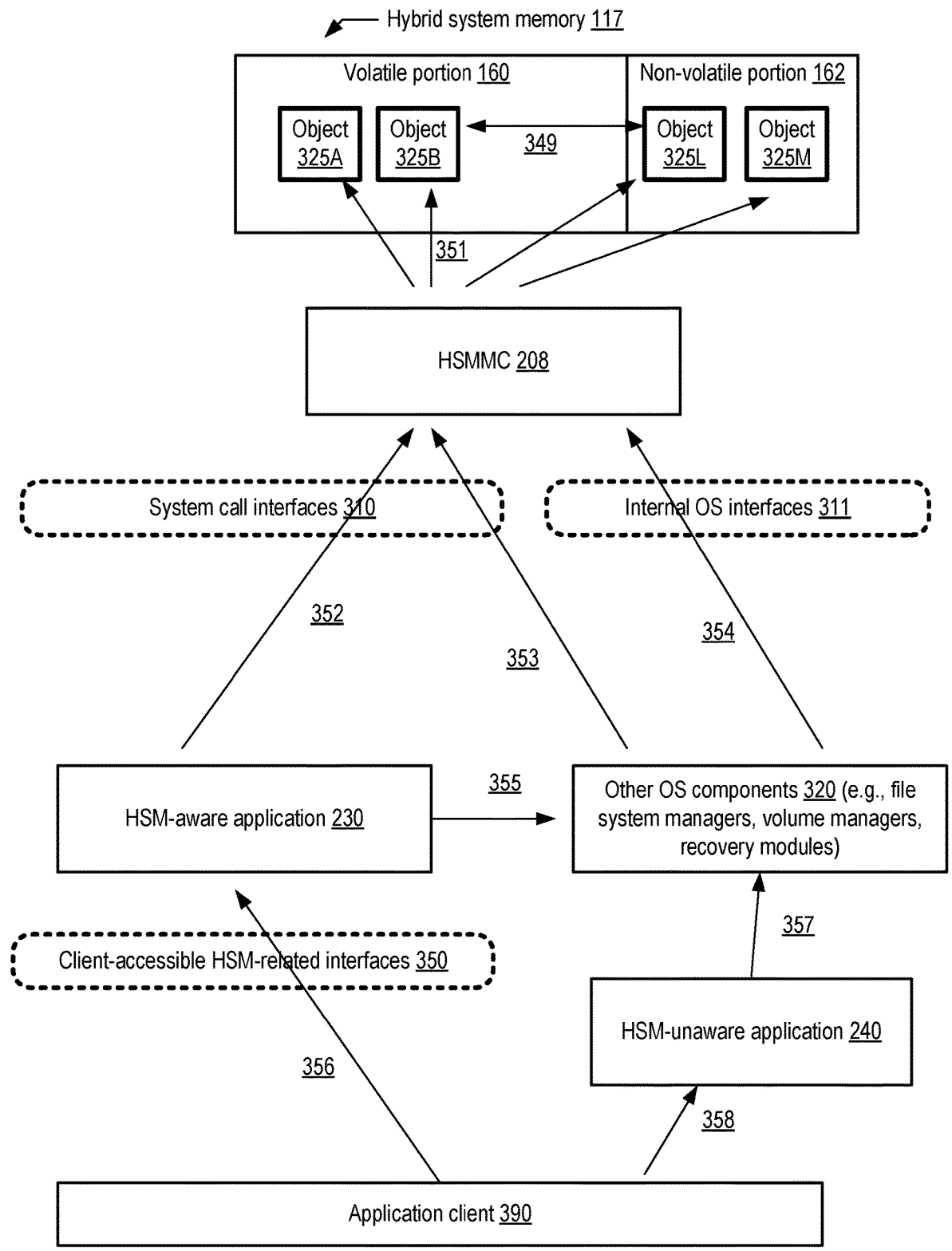
FIG. 3 illustrates example request pathways that may result in a use of non-volatile system memory, according to at least some embodiments.

FIG. 3 illustrates example request pathways that may result in a use of non-volatile system memory, according to at least some embodiments. As shown, an HSMMC 208 may be configured to perform various types of memory management operations on a hybrid system memory 117 comprising volatile portion 160 and non-volatile portion 162 in the depicted embodiment. For example, the HSMMC 208 may allocate various objects in either portion of the HSM, such as objects 325A, 325B, 325M or 325N, as indicated by arrows 351. The HSMMC 208 may also move or relocate objects from the non-volatile portion 162 to the volatile portion 160, or from the volatile portion to the non-volatile portion, as indicated by arrow 349. At least some of the memory management operations may be performed in response to requests received from other operating systems components, or in response to requests resulting from system call invocations by various applications as described below, some of which may in turn result from work requests submitted by application clients 390.

Application clients 390 may request various types of operations in the depicted embodiment, e.g., from either HSM-aware applications 230 (requests indicated by arrow 356) or HSM-unaware applications 240 (arrow 358). In some embodiments, the client-facing interfaces supported by HSM-aware applications, such as interfaces 350 of application 230, may themselves include HSM-related options. For example, in one database HSM-aware application, a client 390 may be allowed to provide a hint or preference regarding the type of memory to be used for metadata associated with a particular table, e.g., in the form of a parameter of a "create table" command. Such hints or preferences may be taken into account by the HSM-aware database application when obtaining memory for the metadata from the HSMMC 208, for example.

In various embodiments, one or more I/O-related components of the operating system may be HSM-aware, at the hosts or compute instances at which HSM-aware and/or HSM-unaware applications 230 or 240 are executed. For example, file system journal entries may be written to NVSM, per-file write caches or per-block-device write caches may utilize NVSM, and so on. In FIG. 3, arrows 355 and 357 respectively indicate requests from HSM-aware applications and HSM-unaware applications to such operating system components. The requests 355 and 357 (e.g., requests to create files or write to files) may be processed at the operating system components 320, and at least in some cases may result in the use of non-volatile system memory for the affected metadata and/or data. It is noted that with respect to requests 355 and 357, the applications submitting the requests may not indicate any preferences about non-volatile or volatile memory, but the operating system components 320 may nevertheless make decisions in at least some embodiments to use non-volatile memory. In at least some cases, the applications 230 or 240 may not be aware that their requests to the operating system components 320 resulted in the use of non-volatile memory in the depicted embodiment.

According to at least some embodiments, the HSM-aware application 230 and/or the operating system components 320 may utilize system call interfaces 310 to submit memory-related requests to the HSMMC 208. Arrow 352 represents such system call invocations by HSM-aware applications in the depicted embodiment, while arrow 353 represents system call invocations by operating system components 320. In some implementations, a set of memory-related system calls may be extended (such as by adding optional parameter fields) to provide support for non-volatile memory. In other implementations, new system calls may be implemented, e.g., in a new release or version of an operating system or hypervisor, to support operations that indicate caller preferences for one type of system memory over another. Various system calls may be enhanced or added in different embodiments, including for example various flavors or variations of malloc( ), brk( ), mmap( ), alloca( ), malloc_get_state( ), malloc_info( ), malloc_trim( ), malloc_usable_size( ), mallopt( ), shmat( ), shmctl( ), shmget( ), or other memory-related system calls often implemented in Unix™-based operating systems. In addition to, or instead of, using the system call interfaces 310, in at least some implementations the OS components 310 may utilize internal operating system interfaces 311 to request memory-related operations associated with non-volatile system memory. Internal operating system interfaces 311 may not be available for use by user-mode applications in the depicted embodiment, and may only be available for kernel-mode components. In some embodiments, recovery modules within the operating system, or at the application level, may also utilize at least some of the system call interfaces 310 and/or internal interfaces 311, e.g., to store their own recovery-related metadata at least temporarily. New interfaces may be provided in some embodiments for moving objects between non-volatile and volatile portions of system memory, e.g., for elevating or lowering the durability level for a specified memory. For example, a make_nonvolatile( ) interface may enable the caller to request that an object be moved to nonvolatile memory, and a make_volatile( ) interface may enable the caller to request that an object be moved to volatile memory in one such embodiment. Various other system calls and/or interfaces may also be implemented for operations related to the use of non-volatile system memory in different embodiments. It is noted that at least in some embodiments, a best-effort approach towards providing non-volatile memory may be implemented by an HSMMCs—e.g., when an application or OS component requests non-volatile memory, the HSMMC may instead provide volatile memory (and an appropriate result code) if sufficient space is available in the VSM but not in the NVSM.

Figure 4:
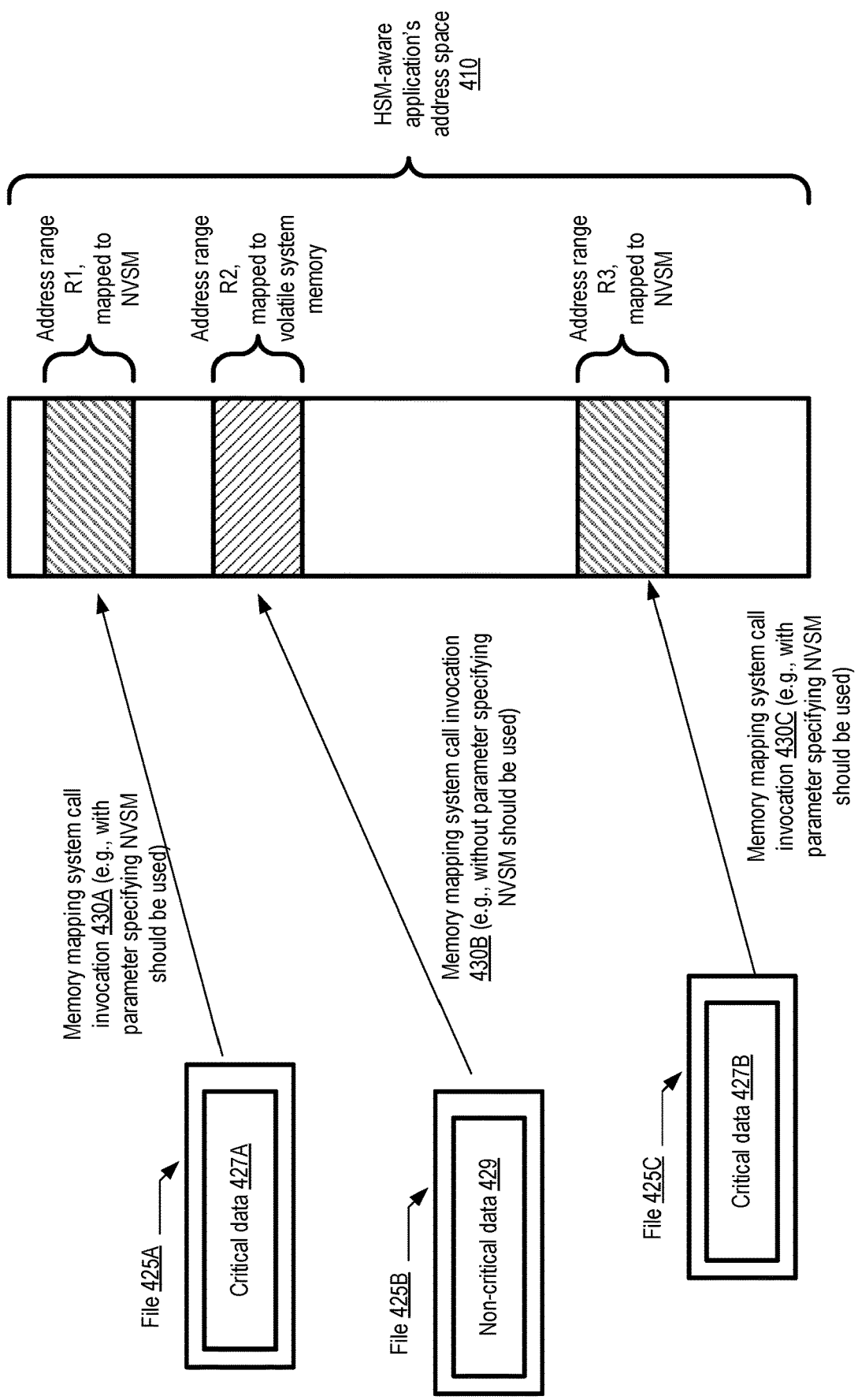
FIG. 4 illustrates an example of a use of a memory mapping technique for application data for which high durability is desired, according to at least some embodiments.

In some embodiments, operations that allow application-level code to access file and/or device data that has been mapped to non-volatile memory may be supported. FIG. 4 illustrates an example of a use of a memory mapping technique for application data for which high durability is desired, according to at least some embodiments. As shown, various portions of an HSM-aware application's address space 410 may be used for mapping files 425, such as files 425A, 425B and 425C. Some files, such as 425A and 425C, that comprise critical application data 427A and 427B respectively, to which access may be required to rapidly restore application state may be mapped to non-volatile system memory (e.g., ranges R1 and R3 of address space 410 may correspond to NVSM). Other files such as file 425B, that contain less critical data 429, may be mapped to volatile system memory (e.g., range R2 of address space 410). It is noted that in addition to being used for mapping files to application address space, in various embodiments other operating system devices may be mapped to NVSM, and anonymous memory mapping (mapping an area of the application address space that is not backed by any file or device to NVSM) may also be supported in at least some embodiments.

Just as in the case of memory mapped I/O in general, the overhead of copying data between user space and kernel space buffers may be reduced (relative to unmapped file read and write operations, for example) using memory mappings to non-volatile system memory. The need for operations such as lseek( ) to access different offsets within a file may also be eliminated when memory-mapped I/O is used. In addition, concurrent shared access to data objects may also be facilitated using memory mappings in at least some embodiments. In one implementation, a "NON_VOLATILE" flag may be added to various memory mapping system calls (such as variants of mmap( )) to indicate that the requested file (or other device) be mapped to non-volatile memory, as indicated by arrows 430A and 430C. If the NON_VOLATILE flag or its equivalent is not used (as in the case of system call invocation 430B), volatile system memory may be mapped instead. In other embodiments, special system calls or other programmatic interfaces may be designed for non-volatile memory mapping. Combining high durability for critical state information with the performance advantages of memory mapping may enable rapid recovery after failures for many types of applications in various embodiments. In addition, because writing to memory-mapped regions of the address space may typically be more efficient compared to other forms of I/O, the time taken to save critical state information of the application may be reduced substantially, reducing the lengths of vulnerable periods during which application state may be corrupted due to failures or race conditions.

Figure 5:
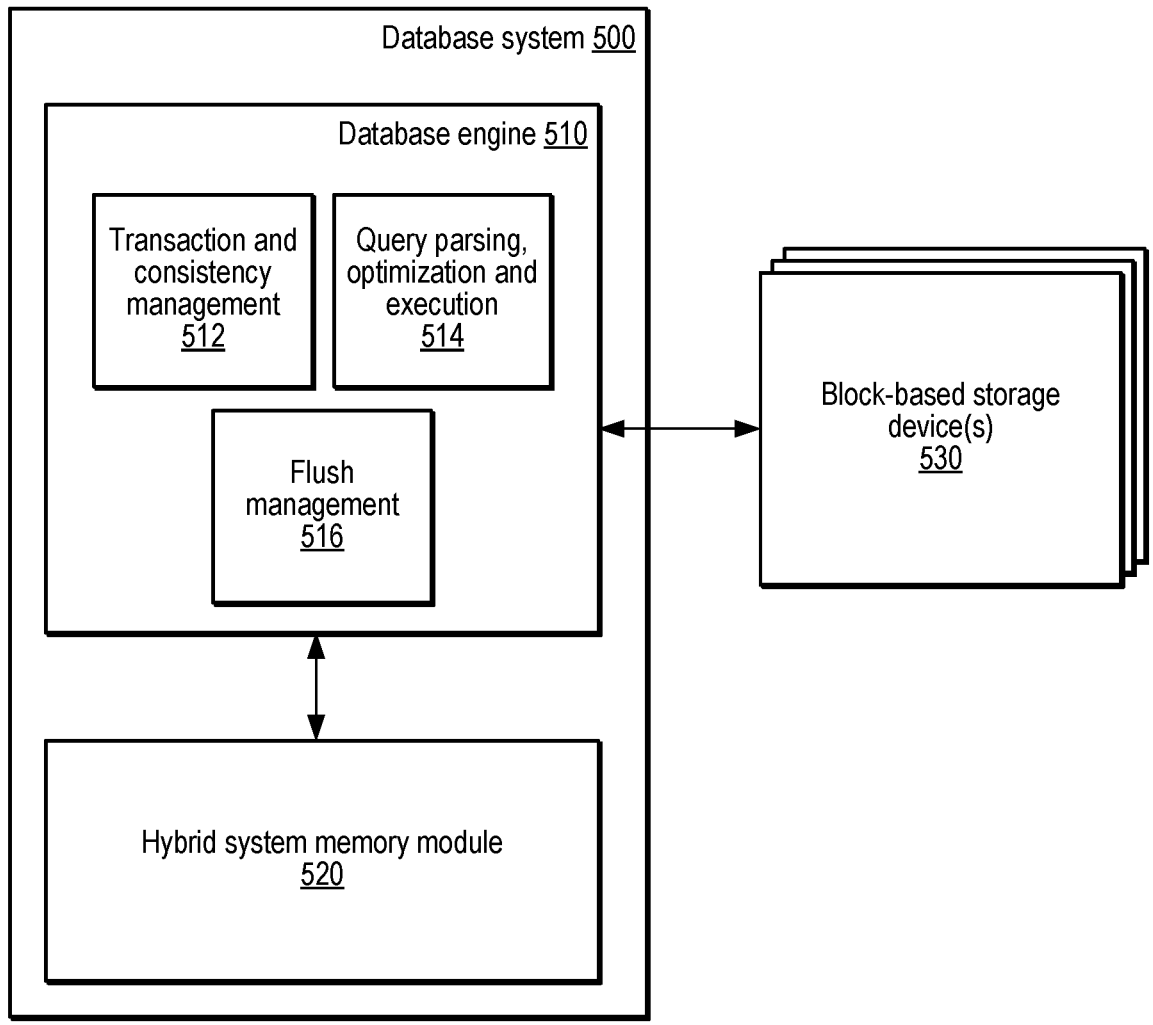
FIG. 5 illustrates an example database system implementing non-volatile system memory for database journaling, according to some embodiments.

FIG. 5 illustrates an example database system implementing non-volatile system memory for database journaling, according to some embodiments. A database system 500 may be implemented on one or more computing devices, such as computing system 1000 described below with regard to FIG. 9. Database system 500 may provide a database for database clients to access and perform various operations on.

Database system 500 may be implemented, in some embodiments, as a distributed database system employing multiple database nodes configured to access the same or different databases. In some embodiments, the distributed database system, or a single monolithic database system, may be offered as a network-based database service configured to provide a database over a network to one or more database clients.

Database 500 may implement various different modules and/or components in order to implement efficient database journaling using non-volatile system memory. As illustrated in FIG. 5, a database engine 510 may be implemented which may communicate with both a hybrid system memory module 520 and block-based storage devices 530. Hybrid system memory module 520 may be similar to hybrid system memory 117 discussed above with regard to FIGS. 1-4. For example, one or more volatile system memory modules or devices and one or more non-volatile system memory modules or devices may be implemented together in a hybrid system memory module 530. Although not illustrated, database engine 510 may be configured to directly access the hybrid system memory module 520 via an interface or hybrid memory module controller, such as discussed above with regard to FIGS. 2 and 3. In at least some embodiments, database engine 510 may directly access hybrid system memory module 520 without requesting or receiving access via an operating system kernel component. Hybrid system memory module 530 may be byte addressable.

Database engine 510 may also be configured to access block-based storage device(s) 530. These block-based storage device(s) 530 may be one or more of any of the off-board persistent storage devices or block-based storage devices such as solid state drives, disk-based, or other mechanical or non-mechanical persistent storage devices discussed above with regard to FIGS. 1A and 1B. In some embodiments, block-based storage devices may have a minimum write size, such as block or sector of data (e.g., 512 bytes or 4096 bytes).

Hybrid system memory module 520 and block-based storage devices 530 may both be configured to persist portions of a log for database engine 510. In some embodiments, the portion of the log persisted in hybrid system memory module 520 may be different than the portion of the log persisted in block-based storage device(s) 530.

Database engine 510 may implement various different components or modules, either through hardware, software, or a combination of both, in order to implement a database. Database engine 510 may implement a transaction and consistency management module 512 which may be configured to perform recovery, such as discussed below with regard to FIG. 7, as well as implement the various database journaling techniques discussed below with regard to FIG. 6. Transaction and consistency management module 512 may be responsible for providing transactionality and consistency in the database. For example, this component may be responsible for ensuring the Atomicity, Consistency, Isolation, and Durability properties of the database and the transactions that are directed that the database. For example, transaction and consistency management module 512 implement generate and send log records to a non-volatile portion of system memory in hybrid memory module component 520 for a redo log, transaction log, and undo log, which may be employed by transaction and consistency management component to track the status of various transactions and roll back any results of transactions that do not commit. Transaction and consistency management module 512 may also be configured to determine a consistent state of the database to make available upon recovery from a failure of database engine 510 or database system 500.

Database engine 510 may also implement query parsing, optimization, and execution module 514 to provide access to the database for database clients. Query parsing, optimization, and execution module 514 may receive requests for a particular view of the database (e.g., a snapshot request, etc.) from database clients, then parses them, optimizes them, and develops an execution plan to carry out the associated database operation(s). Query parsing, optimization, and execution module 514 may perform these functions for queries that are received from a database client and that target the database. In some embodiments, query parsing, optimization, and execution component 514 may return query responses to a database client, which may include write acknowledgements, requested data pages (or portions thereof), error messages, and or other responses, as appropriate.

Database engine 510 may also implement flush management module 516 which may be configured to manage flush operations performed between log records maintained in a non-volatile portion of system memory in hybrid memory module component 520 and block-based storage device(s) 530. For instance, flush management module 516 may be configured to detect a flush event, such as determining that the amount of available storage space in the non-volatile portion of the system memory storing a portion of the log is below an available space threshold. Various other techniques may be implemented, such as those discussed below with regard to FIG. 8.

Figure 6:
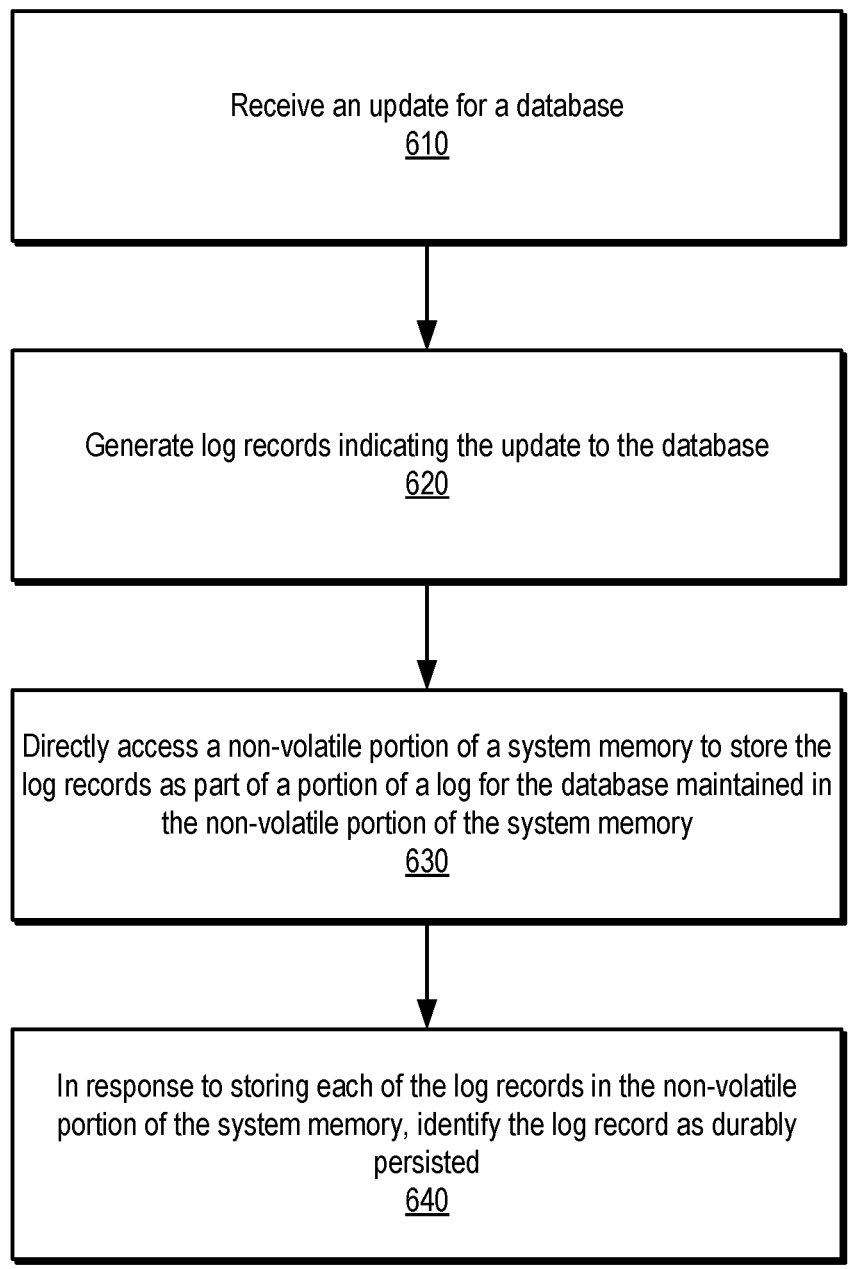
FIG. 6 is a high-level flowchart of a method to implement database journaling using non-volatile system memory, according to some embodiments.

The previous examples of a database system given above describe various embodiments of a database system that may implement non-volatile system memory for database journaling. The various methods and techniques discussed above, as well as the various components implementing those techniques, such as database engine 510 and hybrid memory system module 520, may also be implemented on a wide variety of different database systems. For example, database system 500 may be implemented as a database node of network-based database, either distributed or monolithic. In some embodiments, the database system may be implemented in a distributed database system that is offered as a network-based database service, offering different clients the ability to implement cloud-based data storage. As various different types of database systems exist, the previous examples are not intended to be limiting as to the various different types of database systems that may perform the methods and techniques discussed below with regard to FIG. 6. FIG. 6 is a high-level flowchart of a method to implement database journaling using non-volatile system memory, according to some embodiments.

As indicated at 610, an update may be received for a database, in some embodiments. An update may be received in the form of a user transaction or other request to update, change, and/or modify data stored for the database. For example, an update may request the insertion of a new row in a database table. Log records indicating the update to the database may be generated, as indicated at 620. Consider the scenario where an update to the database may be a user transaction received at the database in order to perform one or more changes to the database. Redo log records indicating changes to data stored for the database may be generated in order to be replayed in the event of a database failure. Undo log records may also be generated, in order to undo the effects of the user transaction if it is not completed. Other log records may be generated indicating updates to a transaction table or other data structure and/or metadata indicating the current state of transactions. More generally, log records may be generated in order to provide atomicity and consistency for updates performed at the database such that in the event of a database failure, a consistent state of the database may be determined.

In various embodiments, a non-volatile portion of the system memory may be directly accessed to store the generated log records in a portion of the log for the database maintained in the non-volatile portion of the system memory, as indicated at 630. As discussed above with regard to FIGS. 2 and 3, a non-volatile portion of system memory, such as NVSM implemented as part of a hybrid memory module, may be directly addressable by the database engine. In some embodiments, access to the non-volatile system memory to store log records may be performed without accessing the non-volatile system memory via an operating system kernel or other intermediary. Instead, as discussed above, the non-volatile system memory may be directly accessible to a database engine, system or application in order to allocate a portion for storing a portion of the log for the database via a hybrid system memory module controller, such as illustrated at 352 in FIG. 3 above.

Storing log records in a portion of the log for the database in a non-volatile portion of system memory may offer several advantages. For example, in some embodiments, log records may be tightly packed into the non-volatile portion of the system memory. Non-volatile system memory may be byte-addressable, allowing data to be written to the non-volatile system memory byte-by-byte. Off-board persistent storage devices, such as solid state drives, disc-based storage, etc., by contrast, often impose minimum write sizes of much larger quantities than a single byte, such as 512 bytes or 4096 bytes per write. If a log record is to be stored in a single write, space may not be efficiently utilized in the individual data blocks of the off-board persistent storage device, creating fragmentation. Instead, when storing log records in non-volatile system memory, individual log records, which may vary in size, may be stored contiguously according to byte boundaries. For example, a log record that is 4.75 bytes may only waste 0.25 bytes if written according to byte boundaries so that a next log record may be written starting in the next available byte.

Another advantage offered by byte addressable non-volatile system memory, is that portions of an individual log record may be written to the non-volatile system memory such that an incomplete log record may not be included in the log for the database. For example, if a log record is 5.5 bytes, and within the first byte is header information that indicates to a reader of the log portion that new record has begun, its type, or various other log record data and/or metadata, that byte may be written last, so that all other portions of the log record are maintained in non-volatile system memory when the last byte is written. As writing a byte in byte-addressable memory is an atomic operation, either performed completely, or not performed completely, the entire log record may not be indicated as a part of the log (based on evaluating the log header information) until the byte containing the header is written. For instance, if bytes 2, 3, 4, 5, and 6 (containing the 0.5 bytes) information for the example log record are written to non-volatile system memory, and a database or system failure occurs prior to the first byte 1 written, then when scanning or evaluating log records maintained in the non-volatile system memory during recovery, the bytes 2-6 may be disregarded as not associated with a log record. Such a technique, or other similar techniques, may allow for torn or incomplete write operations for a log in non-volatile system memory to be identified and/or ignored for recovery purposes. From the database's perspective, the write may appear to have never occurred (even though most of it was written). The above example is not intended to be limiting as to the various other ways writing a portion of a log record in a byte-by-byte fashion may allow for the detection, prevention, and/or elimination of torn or incomplete writes.

As indicated at 640, in response to storing each of the log records in the non-volatile portion of the system memory, the log record may be identified as durably persisted to the log for the database, in various embodiments. For example, in some embodiments, the log records may be stored in the portion of the log maintained in the non-volatile portion of system memory according to a log record sequence, such as by a log sequence number (LSN) value. Thus when a new log record is stored to the log portion of the non-volatile system memory it may be considered durably persisted, as it may be both durably maintained and complete (i.e., all prior log records upon which it might depend may also be durably maintained). Log records may, in some embodiments, be durably persisted to the log with separately storing the log record to a block-based storage device or other off-board storage device.

Different log portions for different logs for a database may be maintained in the non-volatile portion of system memory, in some embodiments. For example, redo log records may be maintained in a separate portion of a log than undo records. However, in some embodiments, the portion of the log maintained in the non-volatile portion of system memory may include different types of log records in the same portion for the same log.

Figure 7:
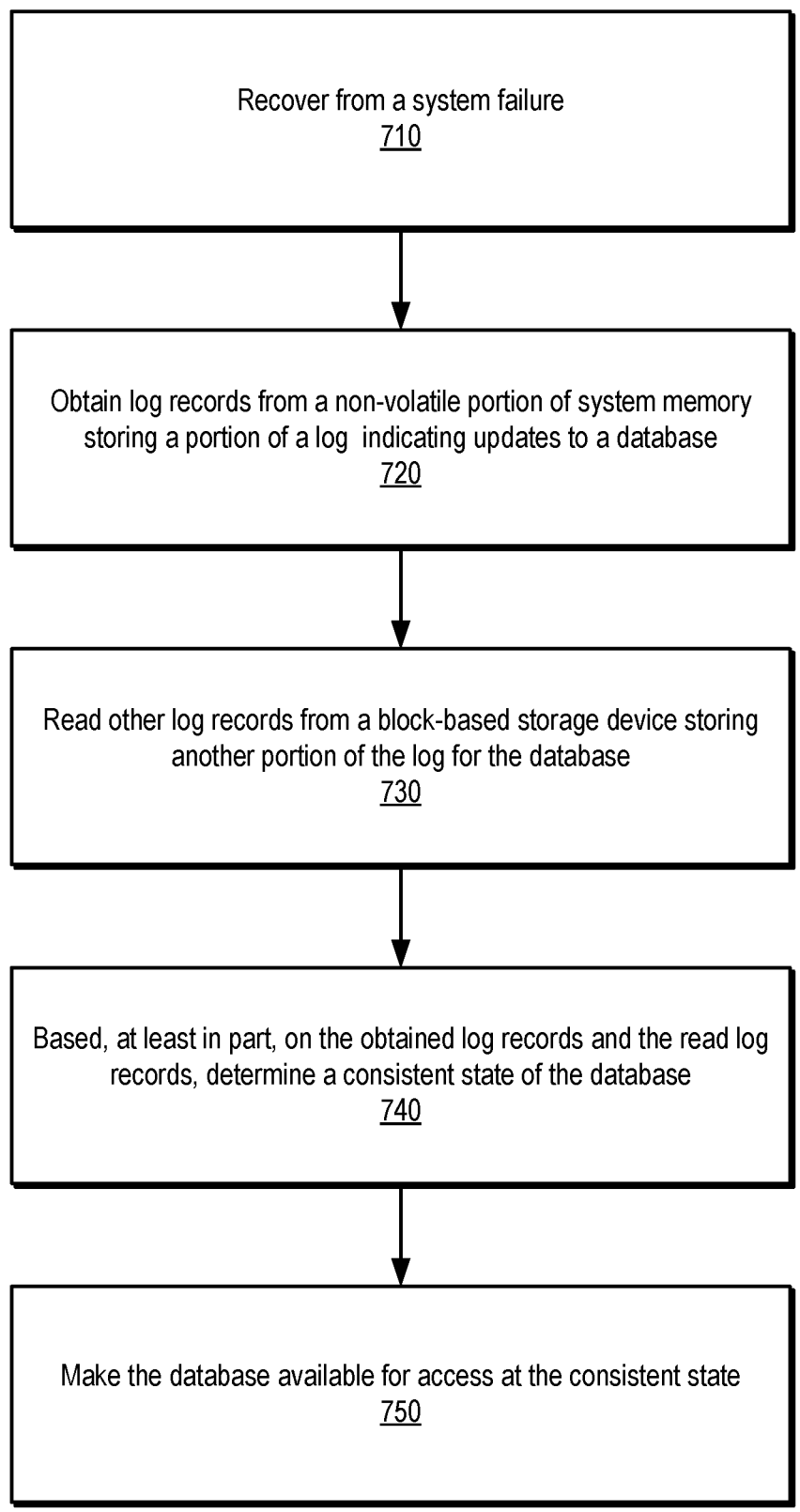
FIG. 7 is a high-level flowchart of performing recovery in a database using non-volatile system memory, according to some embodiments.

In various embodiments, a log for a database may be maintained for recovery of the database. For example, based on the various log records maintained in a log, a consistent state of the database may be determined. A consistent state of the database may, in some embodiments, be a state that ensures that changes to values in the database are consistent with changes to other values in the database. A particular view or state of the database may be identified (which may be a prior point in time) for which such consistency is achieved for the database. FIG. 7 is a high-level flowchart of performing recovery in a database using non-volatile system memory, according to some embodiments. Recovery may be performed in order to make a database available for performing operations at a consistent state.

As indicated at 710, a system failure may be recovered from, in various embodiments. A system failure may be a failure of the database system, hardware upon which the database system is implemented, such as computing system 1000 described below with regard to FIG. 9, the database engine process, or virtual database instance failure. Data maintained in a volatile portion of system memory, may be lost or forgotten in the event of such a failure. Non-volatile system memory, as discussed above with FIG. 1, may be configured to maintain data, even in the event of a system failure. Upon recovery, the data may be maintained in the non-volatile portion of system memory (or restored to a portion of system memory such that it appears to the database system that data is durably maintained in the portion of the system memory).

As indicated at 720, in various embodiments, log records may be obtained from the non-volatile portion of the system memory storing a portion of the log for the database. An access operation, such as a read operation may, in some embodiments, be directly performed to the non-volatile portion of system memory, such as via a hybrid system memory module system controller (as discussed above with regard to FIG. 2) or some other interface. In some embodiments, the log records may be obtained without accessing the non-volatile portion of system memory via an operating system kernel. The entire portion of the log in the non-volatile portion of the system memory may be obtained, or select log records or ranges of log records may be obtained, in some embodiments.

Figure 8:
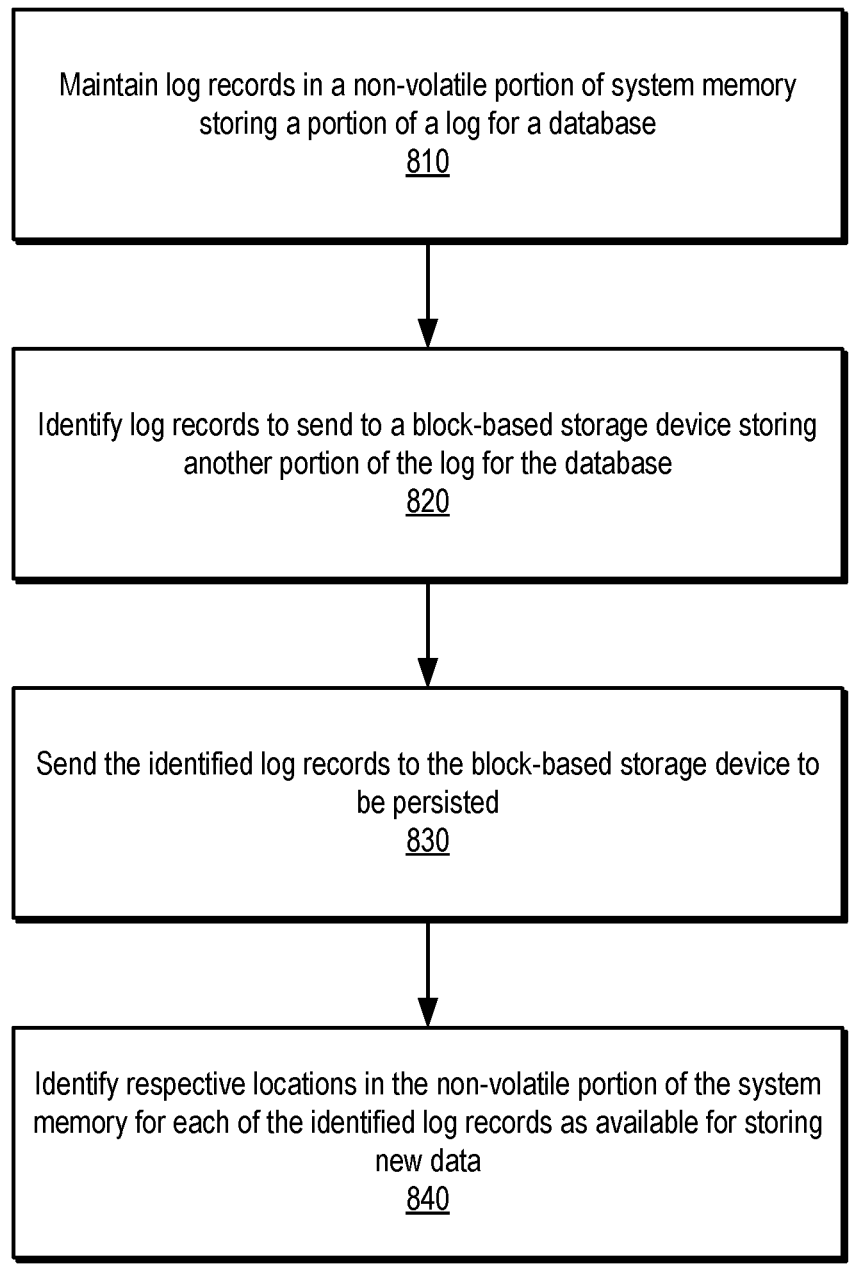
FIG. 8 is a high-level flowchart of selecting log records to be moved from non-volatile system memory to block-based storage, according to some embodiments.

As discussed above with regard to FIG. 5, and below with regard to FIG. 8, another or remaining portion of the log may be persisted in a block-based storage device, or some other persistent off-board storage device. Log records from the block-based storage device storing another portion of the log may also be read, in some embodiments, as indicated at 730, in order to perform database recovery. As discussed with the non-volatile portion of the system memory above, the entire portion of the log may be obtained, or select log records, or ranges of log records may be obtained, in some embodiments.

Based, at least in part, on the obtained log records from the non-volatile portion of the system memory and/or the log records read from the block-based storage device, a consistent state of the database may be determined, as indicated at 740. Various different recovery techniques may be implemented in order to determine a consistent state of the database. For example, in some embodiments, an Algorithms for Recovery and Isolation Exploiting Semantics (ARIES) or ARIES-like recovery technique may be performed in order to determine a consistent state of the database. For example, various redo log records (indicating changes applied to data) may be played forward (i.e. applied) to a prior version of data stored for the database up until the last durably persisted redo log record (e.g., at the time of the database failure). If a user transaction was being performed, but not yet completed, at the time of the database failure, transaction table entries, various transaction status indications in log records, or any other transaction metadata may be used to determine that a number of the changes applied by the redo log records may need to be undone, by applying one or more undo log records that may also be maintained in the non-volatile portion of the system memory. Various other log-based recovery techniques may be performed based on log records obtained from the non-volatile portion of system memory (as well as log records obtained from block-based storage devices), and as such, the previous examples is not intended to be limiting.

As indicated at 750, the database may then be made available at the determined consistent state, in some embodiments. Making the database available may be performed in different ways. For example, in some embodiments, log records that occur after the determined consistent state may be truncated or forgotten such that they are no longer applied or considered in determining the state of the database. In some embodiments, making the database available may include determining a new position a log record sequence that occurs after the consistent state, such that subsequent updates are assigned positions in the log record sequence that are identifiable as to be included in future recovery and/or other database operations. For example, if a consistent state of the database is determined to be at LSN 10,000. Then, new LSN values may be assigned at a subsequent value (e.g. 11,000) so that they may be clearly distinguished as occurring after the consistent state in the database for recovery.

When performing access operations, the consistent state of the database may be the state of the database to which new log records are dependent. If, for example, a consistent state of the database has a redo log record that has changed an entry in a database table to value 10210, and a new log record indicating a change to the same entry (+1) in the database is generated, the new redo log record may be referencing the redo log record indicating the value as 10210. Upon recovery the two log records may generate a value for the entry as 10211 (ignoring any intervening log records in the log that are past the consistent state of the database).

A database system implementing non-volatile system memory for database journaling may, in various embodiments, perform different techniques to manage the contents of the portion of the log for the database in the non-volatile portion of the system memory. FIG. 8 is a high-level flowchart of selecting log records to be moved from non-volatile system memory to block-based storage, according to some embodiments. As indicated at 810, log records may be maintained in a non-volatile portion of system memory storing a portion of a log for a database, in some embodiments. As discussed above, the log records may be maintained in the non-volatile portion of system memory even in the event of a system failure that may cause data loss in volatile portions of system memory.

In some embodiments, log records may be identified to send to a block-based storage device storing another portion of the log for the database, as indicated at 820. These log records may be identified according to their respective positions in the log records sequence for the log for the database. For example, log records may be determined to be the oldest, or lowest LSN values of log records in the non-volatile portion of the system memory. These log records may also completion a portion of the log record sequence that is not currently stored in the portion of the log in the block-based storage device. As the next complete portion, these log records may be identified to send to the block-based storage device. For example, if portion of the log in the non-volatile system memory stores log records with LSN values 10100 to 10300, and the portion of the log in block-based storage stores log records with LSN values of 0 to 10099, then log records completing the sequence in the block-based storage portion of the log may be identified (e.g., LSN values 10100 to 10150).

In some embodiments, log records may be identified sufficient to exceed a minimum batch storage requirement. For example, as larger amounts of data may be more efficiently written to block-based storage devices than smaller amounts of data, log records may be written (sometimes referred to as flushed) to the block-based storage device in batches of log records. Batching of log records may, in some embodiments, be determined based on the size of the log records in the potential batch. For example, a batch storage requirement may be at or near a minimum write-size for a block-based storage device. Batching of log records may also be determined based on a number of log records in a potential batch.

As indicated at 830, identified log records may be sent to a block-based storage device to be persisted, in some embodiments. These log records may be written or appended to data blocks, sectors, or other organizational units of the block-based storage device storing another portion of the log for the database system. In some embodiments, the log records may be sent to be stored in a particular order at the block-based storage device, such as according to the log record sequence for log records (e.g., by LSN value).

Once log records have been stored in the block-based storage device, respective locations for the log records may be identified in the non-volatile portion of the system memory as available for storing new data, such as new log records, as indicated at 840. These identified locations may be marked or identified as garbage collectible. Garbage collection or some other reclamation process for memory in the portion of the log maintained in the non-volatile portion of the system memory may be performed (e.g., moving and compacting techniques). A hybrid system memory module controller, such as discussed above with regard to FIGS. 2 and 3, may allow a database system to instigate, or direct garbage collection for available storage locations in the non-volatile portion of the system memory.

In at least some embodiments, the portion of the log in the non-volatile portion of the system memory may be evaluated, to identify log records that no longer need to be maintained. For example, in some embodiments, log records may identify the start, status, and completion of transactions or protocols, such as recording acknowledgments in a two-phase commit protocol. These log records may be ephemeral, such that only the current value indicated in the log record may be needed. For these log records that become or can be identified as obsolete, an indication or marking may be made such that the log record may be identified as garbage collection, and available for storing new data, as discussed above.

The various techniques to identify and move log records from the non-volatile portion may be performed at different times and or in response to different events. In some embodiments, flushing log records to block-based storage, as described above with regard to FIG. 8, may be performed as part of a background process (while foreground processing such as generating and storing new log records may also be performed). Thus, flushing log records may occur when operational resources of the database system are available to identify and send log records to block-based storage. In some embodiments, flushing log records may be performed in response to crossing various time thresholds, similar to checkpointing, that periodically or aperiodically instigate moving log records to block-based storage. In some embodiments, a flush event may be detected, such as the amount of available space in the non-volatile portion of the system memory falling below an available space threshold, and flushing log records may be performed in response.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein).

Figure 9:
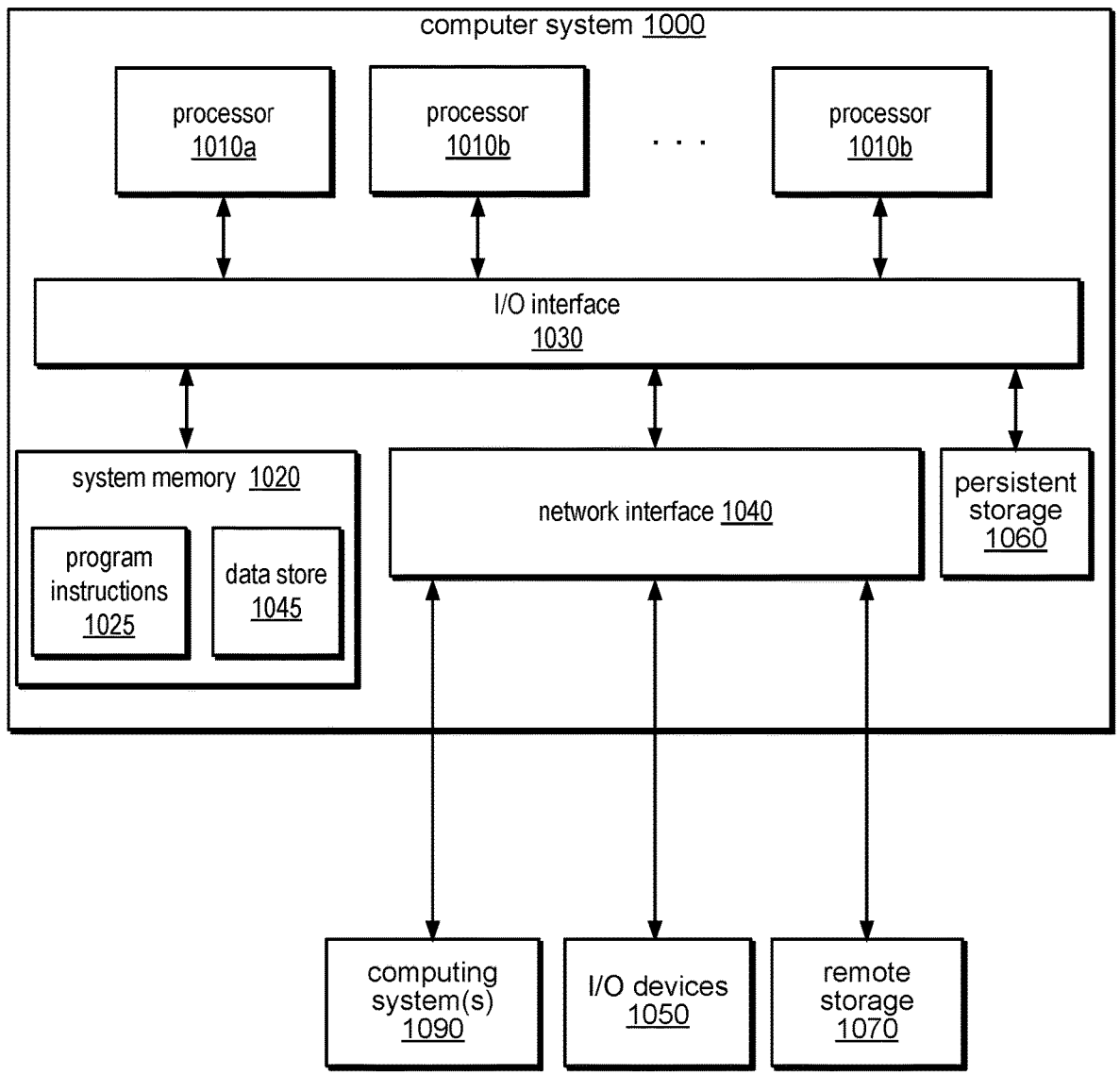
FIG. 9 is a block diagram illustrating a computer system, according to various embodiments.

FIG. 9 is a block diagram illustrating an example computer system, according to various embodiments. For example, computer system 1000 may be configured to implement a computing system accessible implementing non-volatile system memory and/or a database system, or one of a plurality of database systems, such as may be database nodes of a distributed database system. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may be the various described hybrid system memory devices or non-volatile system memory discussed above with regard to FIGS. 1-5. System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine, in different embodiments.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database engine in the portion of the log may be stored in data store 1045 or in another portion of system memory 1020, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ distributed storage systems as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   one or more processors;
   a system memory linked to the one or more processors, wherein the system memory comprises one or more non-volatile memory modules and one or more volatile memory modules;
   the system memory storing program instructions that when executed by the one or more processors cause the one or more processors to implement a database engine, configured to:
      receive an update to a database;
      in response to the update:
         generate one or more log records indicating the update to the database;
         add the one or more log records to a log, having one or more portions, for the database, wherein the one or more log records are added to a first portion of the log that is maintained in an addressable portion of the one or more non-volatile memory modules of the system memory to recover a consistent state of the database in an event of a subsequent database engine failure that results in the loss of data stored in the one or more volatile memory modules of the system memory, wherein the addressable portion is mapped into an application address space of the database engine, and wherein the non-volatile portion is byte-addressable; and
         flushing the one or more log records from the non-volatile portion of the system memory to a block-based storage device based on an amount of available storage space in the non-volatile portion of the system memory.

2. The system of claim 1, further comprising:
   one or more block-based storage devices, configured to persistently store data for the database;
   wherein the addressable portion of the non-volatile memory module further stores a plurality of previously generated log records indicating previously received updates to the database and acknowledged as durably persisted;
   wherein the database engine is further configured to:
      identify at least one log record stored in the addressable portion of the non-volatile memory module to store in the one or more block-based storage devices; and
      store the at least one log record in the one or more block-based storage devices.

3. The system of claim 1, further comprising:
   the system memory storing program instructions that when executed by the one or more processors cause the one or more processors to further implement an operating system kernel configured to service access requests directed to the one or more non-volatile memory modules and the one or more volatile memory modules;
   wherein, to store the one or more log records to the addressable portion of the non-volatile memory module, the database engine is further configured to access the addressable portion of the non-volatile memory module without obtaining access to the non-volatile memory module via the operating system kernel.

4. The system of claim 1, wherein the portion of the non-volatile memory module maintains a plurality of previously generated log records indicating previously received updates to the database and acknowledged as durably persisted, wherein the database engine is further configured to:
   upon recovery from a system failure:
      read from the addressable portion of the non-volatile memory module at least some log records maintained in the non-volatile memory module; and
      based, at least in part, on the at least some log records, determine a consistent state of the database.

5. A method, comprising:
   performing, by a computing device:
      in response to an update for a database:
         generating one or more log records indicating the update to the database;
         accessing a non-volatile portion of a system memory of the computing device to add the one or more log records to a log, having one or more portions, for the database, wherein the one or more log records are added to a first portion of the log, wherein the first portion of the log is maintained in the non-volatile portion of the system memory in order to recover a consistent state of the database in an event of a subsequent failure causing data loss in a volatile portion of the system memory, wherein the non-volatile portion is mapped into an application address space, and wherein the non-volatile portion is byte-addressable; and
         flushing the one or more log records from the non-volatile portion of the system memory to a block-based storage device based on an amount of available storage space in the non-volatile portion of the system memory.

6. The method of claim 5, wherein the non-volatile portion of system memory maintains a plurality of previously generated log records indicating previously received updates to the database that are identified as durably persisted, wherein the method further comprises:
   upon recovery from a system failure:
      obtaining from the non-volatile system memory the one or more log records and the plurality of previously generated log records;
      based, at least in part, on the obtained log records, determining a consistent state of the database; and
      making the database available for access at the consistent state.

7. The method of claim 5, wherein said accessing the non-volatile portion of the system memory to store the one or more log records, comprises writing portions of each of the one or more log records to the non-volatile portion of the system memory such that an incomplete log record is not identified as a log record in the log for the database.

8. The method of claim 5, wherein the non-volatile portion of system memory maintains a plurality of previously generated log records indicating previously received updates to the database that are identified as durably persisted, and wherein the method further comprises:
identifying at least one log record maintained in the non-volatile portion of the system memory to send to a block-based storage device to be persistently stored; and
sending the at least one log record to the block-based storage device to be persisted.

9. The method of claim 8,
wherein said identifying the at least one log record maintained in the non-volatile system memory to send to the block-based storage device, comprises identifying a number of log records in the non-volatile portion of the system memory that exceed a batch storage requirement; and
wherein said sending the at least one log record to the block-based storage device to be persisted, comprises performing a storage operation to send the identified log records to the block-based storage device to be persisted.

10. The method of claim 5, wherein the non-volatile portion of system memory maintains a plurality of previously generated log records indicating previously received updates to the database that are identified as durably persisted, and wherein the method further comprises:
identifying at least one log record maintained in the non-volatile portion of the system memory that is no longer to be maintained.

11. The method of claim 5, wherein said accessing the non-volatile portion of the system memory to store the one or more log records comprises storing each of the one or more log records contiguously in the non-volatile portion of the system memory according to byte boundaries.

12. The method of claim 5, further comprising in response to storing each of the one or more log records in the non-volatile portion of the system memory, identifying the log record as durably persisted without being persisted to a block-based storage device.

13. One or more non-transitory, computer-readable storage media, storing program instructions that when executed on or across one or more processors cause the processors to implement a database engine that implements:
in response to an update for a database:
generating one or more log records indicating the update to the database;
accessing, by the database engine, a non-volatile portion of a system memory for the one or more processors to add store the one or more log records to a log, having one or more portions, for the database, wherein the one or more log records are added to a first portion of the log, wherein the first portion of the log is maintained in the non-volatile portion of the system memory in order to recover a consistent state of the database in an event of a subsequent failure causing data loss in a volatile portion of the system memory, wherein the non-volatile portion is mapped into an application address space of the database engine, and wherein the non-volatile portion is byte-addressable; and
flushing the one or more log records from the non-volatile portion of the system memory to a block-based storage device based on an amount of available storage space in the non-volatile portion of the system memory.

14. The non-transitory, computer-readable storage medium of claim 13, wherein the non-volatile portion of system memory maintains a plurality of previously generated log records indicating previously received updates to the database that are identified as durably persisted, wherein the database engine further implements:
upon recovery from a system failure:
obtaining from the non-volatile system memory the one or more log records and the plurality of previously generated log records;
based, at least in part, the obtained log records, determining a consistent state of the database; and
making the database available for access at the consistent state.

15. The non-transitory, computer-readable storage medium of claim 14, wherein a block-based storage device accessible to one or more computing devices including the one or more processors stores another portion of the log for the database including another plurality of previously generated log records indicating other previously received updates to the database that are identified as durably persisted, wherein the database engine further implements:
upon recovery from the system failure, read from the block-based storage device at least some of the other plurality of previously received log records;
wherein said determining the consistent state of the database is further based on the at least some of the other plurality of previously received log records.

16. The non-transitory, computer-readable storage medium of claim 13, wherein the non-volatile portion of system memory maintains a plurality of previously generated log records indicating previously received updates to the database that are identified as durably persisted, wherein the database engine further implements:
identifying at least one log record maintained in the non-volatile portion of the system memory to send to a block-based storage device to be persistently stored; and
sending the at least one log record to the block-based storage device to be persisted.

17. The non-transitory, computer-readable storage medium of claim 16, wherein a number of log records exceeding a batch storage requirement are identified as the at least one log record to send to the block-based storage device to be persistently stored.

18. The non-transitory, computer-readable storage medium of claim 16, wherein the database engine performs said generating the one or more log records, said accessing the non-volatile portion of the system memory to store the one or more log records, and said identifying the one or more log records as durably persisted as part of a foreground process, and wherein the database engine performs said identifying the at least one log record, and said sending the at least one log record to the block-based storage device to be persisted as part of a background process.

19. The non-transitory, computer-readable storage medium of claim 13, wherein the database engine further implements:
determining that at least one log record maintained in the non-volatile portion of the system memory is not to be maintained; and
identifying the location of the at least one log record as available to store new data.

20. The non-transitory, computer-readable storage medium of claim 13, wherein the flushing the one or more log records is based on the amount of available storage space in the non-volatile portion of the system memory exceeding a threshold.

* * * * *